C. E. KISTNER.
DIRIGIBLE AUTOMOBILE LAMP DEVICE.
APPLICATION FILED MAR. 24, 1921.

1,431,008.

Patented Oct. 3, 1922.

INVENTOR.
Charles E. Kistner
by Johnson Strohli
ATTORNEY.

Patented Oct. 3, 1922.

1,431,008

UNITED STATES PATENT OFFICE.

CHARLES E. KISTNER, OF CINCINNATI, OHIO.

DIRIGIBLE AUTOMOBILE LAMP DEVICE.

Application filed March 24, 1921. Serial No. 455,090.

*To all whom it may concern:*

Be it known that I, CHARLES E. KISTNER, a citizen of the United States, residing at the city of Cincinnati, in the county of Hamilton and State of Ohio, have invented certain new and useful Improvements in Dirigible Automobile Lamp Devices, of which the following is a specification.

My invention is more particularly adapted for use in connection with the lamps or lights of automobiles, motor trucks or any motor driven vehicles or apparatus.

The object of my invention is to so arrange the lamps of the automobile that when the same goes to the right or left around a curve or swerves in any direction, a portion of the rays of light will be made to follow the path of the automobile, thus a portion of the light rays will always be directed in the path of the same no matter what its course or direction.

It consists essentially in producing a light directing or shifting member combined with a rigid stationary lamp.

It is very simple in construction, cheap of manufacture, highly efficient in use and possesses a marked degree of utility.

Its various features and advantages will readily become apparent from a perusal of the following specification.

Figure 1:
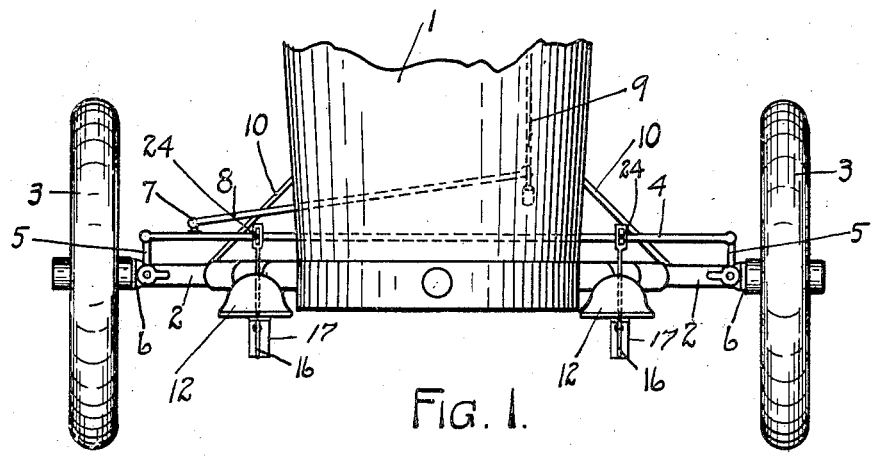
Figure 2:
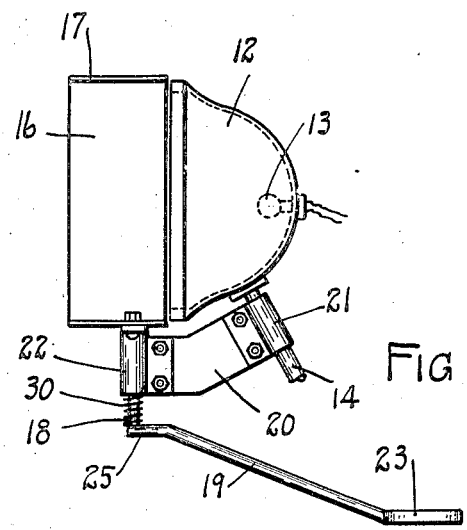
Figure 3:
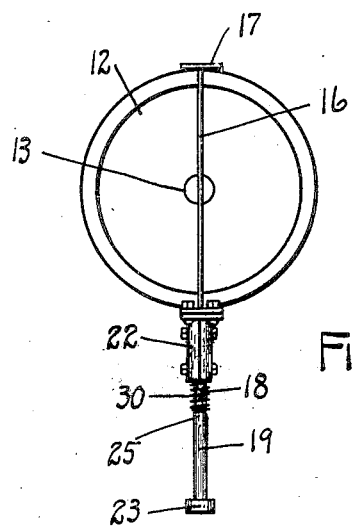
Figure 4:
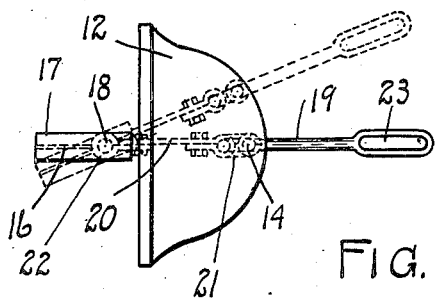

In the accompanying drawing forming part of this specification:

Fig. 1, is a plan view of the front part of an automobile, showing my invention in normal position, Fig. 2, is a side view of my device, Fig. 3, is a front view thereof, and Fig. 4, is a top view of a lamp with my device attached thereto.

In the drawing, the radiator is marked 1, the axle 2, and the wheels 3. To the axle 2, at each side, adjacent to the wheels 3, I pivotally connect the usual connecting rod 4 through short arms 5 connected to the inner hub end 6. At point 7 I connect one end of a connecting arm 8 which at its opposite end is connected to the steering rod 9; and brace rods are marked 10; the construction just set forth is one of a usual form and well known in the art.

The lamps are marked 12 and the electric globe or light therein 13; these lamps are of the usual form and have the usual reflector. The lamps 12 are positioned on lamp supporting rods 14, connected at their upper ends to the lamps and at their opposite ends to the automobile framework or chassis in any approved manner.

In connection with the lamp 12 I employ a shifting shutter which is vertically arranged at the front of the lamp so that it will swing; it usually divides the lamp at its forward part into halves, so that the light rays are equally emitted at each side of the shutter. This shutter is marked 16 and is arranged on each lamp 12; it is connected to an upright rod 18 formed integral with the shifter arm 19. A brace plate 20 reaches from the lamp supporting rod 14 to the shutter supporting rod 18 and at each end is provided with a sleeve marked 21 and 22, the lamp supporting rod passing through the sleeve 21 and the shutter supporting rod 18 passing through the sleeve 22; the rod 18 works and turns in sleeve 22, when the shifter arm 19 is operated. The shifter arm 19, at its lower extremity is provided with a loop or slot 23, which fits over and engages the pin or lug 24 on the connecting rod or bar 4; the pin 24 being of proper height to pass through the loop sufficiently to keep a working and operable connection at all times.

Around the rod 18 and between the bottom of sleeve 22 and upper end 25 of the rod 19, I place a coiled spring 30 which takes up any play or lost motion.

The device is operated as follows: Let us suppose that the operator desires to turn a corner and operates the steering mechanism accordingly; by this operation the connecting rod 4 moves laterally and in doing so the pin 24 thereon moves along with it, and in so doing the looped arm 19 is operated and gradually takes the position shown in Fig. 4 and as the rod 18 is made integral therewith and the shutter 16 is rigidly attached to said rod 18, said rod and shutter are all forced to assume the position into which they are forced by the original movement of the connecting rod 4, thus the shutter 16 travels to assume the position shown in Fig. 4 and diverts the rays of light in a curve the automobile is taking in rounding the curve, consequently these rays of light will always be in the path of the automobile; and this is true no matter in which way the automobile turns or any position it takes; a portion of the rays of light is automatically shifted or turned with it; the lamp remaining stationary.

In order to prevent the rays of light from extending or being diffused upwardly, I provide an outwardly extending plate 17 which is connected at the top of each lamp, and extends over the shutter 16.

While I have described one specific construction for carrying my invention into effect, it will be readily apparent that some changes and modifications can be made therein, without departing from the spirit and principle of my invention, and I claim such modifications will fall within the scope of my invention.

What I claim as new and my invention and desire to secure by Letters Patent is:

1. The combination with a motor vehicle having a connecting rod arranged between its stub axles and fixed headlights rigidly mounted on stationary supports, of brackets fixed to said supports and having bearing sleeves, a vertical shield arranged in front of each of said headlights and intersecting the axis of the headlight with which it co-operates, a pivot pin for each of said shields rotatably mounted in one of said bearing sleeves, an arm having one of its ends rigidly secured to the lower end of one of the pivot pins, a spring interposed between said arm and one of said bearing sleeves, the rear end of each of said arms being provided with an elongated slot, and pins fixed to said connecting rod and engaging said slots.

2. The combination with a headlight, of a vertically arranged shield extending diametrically across the front of the headlight, means for turning said shield about a vertical axis, and a horizontal shield fixed to and extending across the upper end of the first mentioned shield and movable with said first mentioned shield for directing light rays from the headlight downwardly.

In testimony whereof, I affix my signature at Cincinnati, Ohio, this 22nd day of March, 1921.

CHARLES E. KISTNER.